United States Patent
Boettjer et al.

(10) Patent No.: US 10,740,186 B2
(45) Date of Patent: Aug. 11, 2020

(54) HIGH DATA INTEGRITY PROCESSING SYSTEM

(71) Applicant: THE BOEING COMPANY, Chicago, IL (US)

(72) Inventors: Bruce A. Boettjer, Oceanside, CA (US); Maryanne Dooley, Westminster, CA (US)

(73) Assignee: THE BOEING COMPANY, Chicago, IL (US)

( * ) Notice: Subject to any disclaimer, the term of this patent is extended or adjusted under 35 U.S.C. 154(b) by 119 days.

(21) Appl. No.: 15/595,844

(22) Filed: May 15, 2017

(65) Prior Publication Data

US 2018/0329780 A1 Nov. 15, 2018

(51) Int. Cl.
*G06F 11/00* (2006.01)
*G06F 11/14* (2006.01)
(Continued)

(52) U.S. Cl.
CPC ...... *G06F 11/1441* (2013.01); *G06F 11/1064* (2013.01); *G06F 11/183* (2013.01); *G06F 11/184* (2013.01); *G06F 11/187* (2013.01); *G06F 2201/805* (2013.01); *G06F 2201/82* (2013.01)

(58) Field of Classification Search
CPC ............ G06F 11/0763; G06F 11/1405; G06F 11/185; G06F 1/24; G06F 21/44; G11C 5/005
See application file for complete search history.

(56) References Cited

U.S. PATENT DOCUMENTS 5,086,429 A * 2/1992 Gray .................. G06F 11/1645
714/11
5,890,003 A * 3/1999 Cutts, Jr. .................. G06F 9/52
710/263
(Continued)

OTHER PUBLICATIONS

Freescale QorIQ Certification Packet for Avionics, Confidential Version, Glenn Beck, Jul. 2011, 38 pgs.
(Continued)

*Primary Examiner* — Loan L. T. Truong
(74) *Attorney, Agent, or Firm* — Moore Intellectual Property Law, PLLC (57) ABSTRACT

Disclosed is a high data integrity processing system ("HDIPS") that includes a first processing device and a triple voted processing ("TVP") device in signal communication with the first processing device. The first processing device has a high radiation resistance and includes a processor, a cache memory, and a computer-readable medium ("CRM"). The CRM has encoded thereon computer-executable instructions to cause the processer to execute a periodic first integrity check on the first processing device producing a first integrity result, which is transmitted to the TVP device. The TVP device includes firmware having encoded thereon machine instructions to, simultaneously with the periodic first integrity check, cause the TVP device to execute a second integrity check producing a second integrity result, compare the first integrity result with the second integrity result, and power reset the first processing device if the first integrity result does not match the second integrity result.

20 Claims, 6 Drawing Sheets

(51) Int. Cl.
*G06F 11/10* (2006.01)
*G06F 11/18* (2006.01)

(56) References Cited

U.S. PATENT DOCUMENTS

| | | | | |
|---|---|---|---|---|
| 6,151,336 | A * | 11/2000 | Cheng | H04J 3/22 370/535 |
| 6,247,151 | B1 * | 6/2001 | Poisner | G06F 11/1004 365/201 |
| 6,298,289 | B1 * | 10/2001 | Lloyd | B64G 1/10 244/158.1 |
| 7,133,882 | B1 * | 11/2006 | Pringle | G06Q 30/06 |
| 7,415,654 | B2 * | 8/2008 | Redford | G11C 29/56 714/54 |
| 8,155,776 | B2 * | 4/2012 | Bittner | A47G 27/0275 700/131 |
| 8,370,689 | B2 * | 2/2013 | Potter | G06F 11/073 714/42 |
| 8,975,913 | B2 * | 3/2015 | Smith | H03K 19/00346 326/12 |
| 9,318,221 | B2 * | 4/2016 | Tasher | G11C 29/38 |
| 9,467,144 | B2 * | 10/2016 | Clark | H03K 19/0075 |
| 9,672,880 | B2 * | 6/2017 | Buck | G11C 7/02 |
| 9,678,150 | B2 * | 6/2017 | Schelle | G06F 30/33 |
| 10,440,107 | B2 * | 10/2019 | McShane | G06F 12/0813 |
| 2002/0080938 | A1 * | 6/2002 | Alexander, III | H04L 41/22 379/106.01 |
| 2004/0103347 | A1 * | 5/2004 | Sneed | G06F 11/1433 714/32 |
| 2004/0139374 | A1 * | 7/2004 | Meaney | G06F 11/0772 714/48 |
| 2005/0071718 | A1 * | 3/2005 | Jarabek | G11Q 29/42 714/736 |
| 2007/0234138 | A1 * | 10/2007 | Torisaki | G11C 7/24 714/710 |
| 2008/0250185 | A1 * | 10/2008 | Clark | G06F 1/04 710/306 |
| 2008/0263486 | A1 * | 10/2008 | Alexanian | G01R 31/318314 716/106 |
| 2009/0067324 | A1 * | 3/2009 | Licardie | H04L 12/40182 370/225 |
| 2009/0116502 | A1 * | 5/2009 | Hall | G06F 11/182 370/406 |
| 2009/0228977 | A1 * | 9/2009 | Lee | G06F 21/46 726/18 |
| 2011/0126049 | A1 * | 5/2011 | Kessler | G06F 11/1438 714/16 |
| 2011/0254502 | A1 * | 10/2011 | Yount | B60L 3/0046 320/107 |
| 2012/0173480 | A1 * | 7/2012 | Rieffanaugh, Jr. | G06Q 10/00 707/607 |
| 2012/0226965 | A1 * | 9/2012 | Hammerschmidt | H03M 13/093 714/807 |
| 2013/0046941 | A1 * | 2/2013 | Ma | G06F 11/1004 711/155 |
| 2014/0331034 | A1 * | 11/2014 | Ponce | G06F 9/4401 713/1 |
| 2016/0182233 | A1 * | 6/2016 | Go | H04L 9/3242 380/255 |
| 2017/0053710 | A1 * | 2/2017 | Rohleder | G06F 1/10 |
| 2017/0265836 | A1 * | 9/2017 | Laor | A61B 6/542 |
| 2018/0089435 | A1 * | 3/2018 | Zander | G06F 21/575 |
| 2018/0137285 | A1 * | 5/2018 | Yamada | G06F 21/52 |
| 2018/0204004 | A1 * | 7/2018 | Wang | G06F 21/125 |
| 2018/0205551 | A1 * | 7/2018 | Ha | H04L 9/3239 |
| 2019/0028466 | A1 * | 1/2019 | Falk | H04L 9/3268 |
| 2019/0079675 | A1 * | 3/2019 | Yu | H04L 41/04 |
| 2019/0095647 | A1 * | 3/2019 | Merli | G06F 21/57 |
| 2019/0163606 | A1 * | 5/2019 | Liu | G06F 11/3608 |

OTHER PUBLICATIONS

P5020 QorIQ Communications Processor Product Brief, Freescale Semiconductor Product Brief, Document No. P5020PB, Rev. 1, Feb. 2013, © 2011-2013 Freescale Semiconductor, Inc., 32 pgs.
S.M. Guertin, et al., "See Test Results for P2020 and P5020 Freescale Processors", Radiation Effects Data Workshop (REDW) 2014, IEEE, pp. 38-34, Jul. 2014.
First Examination Report dated Apr. 6, 2020 received in corresponding Application No. EP18169923.2, 4 pgs.

* cited by examiner

HIGH DATA INTEGRITY PROCESSING SYSTEM

BACKGROUND

1. Field

The present disclosure is related to devices that operate in environments that produce single event effects ("SEE"), and in particular, to devices that mitigate the effects of SEE.

2. Related Art

At present the feature size of many digital electronic devices have been reduced to sub-micron levels. This reduction in size has resulted in improved performance in terms of power consumption, throughput, speed, and memory density. However, the reduction in feature size has also lead to an increased vulnerability to single event effects ("SEE"), where SEE are caused by single, energetic particles, and can take on many forms. In space, SEE are caused by protons trapped by the Earth's geomagnetic field, galactic cosmic rays, and solar particle events.

Unfortunately, the present trend of shrinking device geometries has also increased the threat of SEE on Earth and at altitudes relevant to aircraft. This is the result of galactic cosmic rays and solar charged particles reacting with the atmosphere to produce a cascade of particles, including energetic neutrons. These neutrons react with the semiconductor materials to produce charged "daughter" products, which may then lead to SEE. Additionally, SEE may also be caused by alpha particles that result from the decay of naturally occurring uranium and thorium in device packages, as well as thermal neutrons interacting with boron-10 sometimes utilized in BPSG (i.e., Boron Phosphate Silicate Glass) in the end-of-line processing of many electronic devices. In general, the neutron exposure rate of an electronic device depends on the altitude and latitude of the electronic device that, for example, increases by over a factor of 700 from sea-level to 43,000 feet at polar latitudes.

It is appreciated by those of ordinary skill in the art that the impact of SEE may range from benign glitches to catastrophic failure due to destructive events such as "latch-up" or "burnout." In general, the most common SEE are single event upsets ("SEU") that flip the logic state of a memory storage element. Additionally, SEE also include single event transients ("SET") in linear devices (such as, for example, comparators or op-amps) that may lead to turn-on of fault-protection such as, for example, power-on-reset or under/over voltage protection. However, of more concern are SEE that cause functional interruption ("SEFI") in which the devices no longer operates as intended until it is reset, power is cycled, or worse SEE that cause single event latch-up ("SEL"). A SEL may resemble SEFI in operation, but, involves a short from power to ground in the electronic device through a parasitic structure. In addition to lockup, symptoms of SEL may include a sudden increase in current that could lead to physical damage of the electronic device. Other destructive SEE include single event burnout and single event gate rupture that are most prevalent in power devices such as, for example, metal-oxide-semiconductor field-effect transistors ("MOSFETs").

Known approaches to address SEE include utilizing hardware that includes a high data integrity requirement that is implemented utilizing multiple processors in a clock-lock-step configuration that is custom designed and costly. These approaches utilize lock-step computing in parallel and formalized voting results in especially hardened circuits (i.e., hardware) that may be, for example, triple mode redundant. Typically this hardware is implemented as one or more application specific integrated circuits ("ASICs") with expensive low volume yields (i.e., very few are produced since the ASICs are custom designed and produced for specific uses). Moreover, these ASICs are typically designed to be free of design errors, unintended features, or both and must be verified and validated to that effect, which further increases the cost of production of the ASICs. Therefore, there is a need for system and method that overcomes these issues and utilizes non-custom hardware.

SUMMARY

Disclosed is a high data integrity processing system ("HDIPS"). The HDIPS includes a first processing device and a triple voted processing ("TVP") device in signal communication with the first processing device. The first processing device has a high radiation resistance and includes a processor, a cache memory, and a computer-readable medium ("CRM"). The CRM has encoded thereon computer-executable instructions to cause the processer to execute a periodic first integrity check on the first processing device that produces a first integrity result, which is transmitted to the TVP device. The TVP device includes firmware having encoded thereon machine instructions to cause the TVP device to execute a second integrity check, simultaneously with the periodic first integrity check on the first processing device, that produces a second integrity result, compare the first integrity result with the second integrity result, and power reset the first processing device if the first integrity result does not match the second integrity result.

In an example of operation, the HDIPS performs a method that includes executing a periodic first integrity check on the first processing device, having a high radiation resistance, producing the first integrity result and executing the second integrity check, simultaneously with the periodic first integrity check, on the TVP device producing a second integrity result. The method then includes comparing the first integrity result with the second integrity result and power resetting the first processing device if the first integrity result does not match the second integrity result.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Disclosed is a high data integrity processing system ("HDIPS"). The HDIPS includes a first processing device and a triple voted processing ("TVP") device in signal communication with the first processing device. The first processing device has a high radiation resistance and includes a processor, a cache memory, and a computer-readable medium ("CRM"). The CRM has encoded thereon computer-executable instructions to cause the processor to execute a periodic first integrity check on the first processing device that produces a first integrity result, which is transmitted to the TVP device. The TVP device includes firmware having encoded thereon machine instructions to cause the TVP device to execute a second integrity check, simultaneously with the periodic first integrity check on the first processing device, that produces a second integrity result, compare the first integrity result with the second integrity result, and power reset the first processing device if the first integrity result does not match the second integrity result. The HDIPS addresses the problems addressed earlier with regards to single event effects ("SEE") and allows for a non-custom hardware first processing device to produce output signals (i.e., data signals) that have high integrity (i.e., high immunity to SEE) with the assistance of the TVP.

In general, the HDIPS will be part of a vehicle that is in traveling through a high radiation environment that causes SEE on devices in the vehicle. The vehicle may be for example a spaceship, aircraft (both manned and unmanned), or a land vehicle traveling at high altitude. In operation, the HDIPS may be part of, for example, a navigation system or other systems that control the functions of the vehicle (in a SEE environment) in a way that may be hazardous if the effects of SEE are not mitigated.

In an example of operation, the HDIPS performs a method that includes executing a periodic first integrity check on the first processing device, having a high radiation resistance, producing the first integrity result and executing the second integrity check, simultaneously with the periodic first integrity check, on the TVP device producing a second integrity result. The method then includes comparing the first integrity result with the second integrity result and power resetting the first processing device if the first integrity result does not match the second integrity result.

Figure 1:
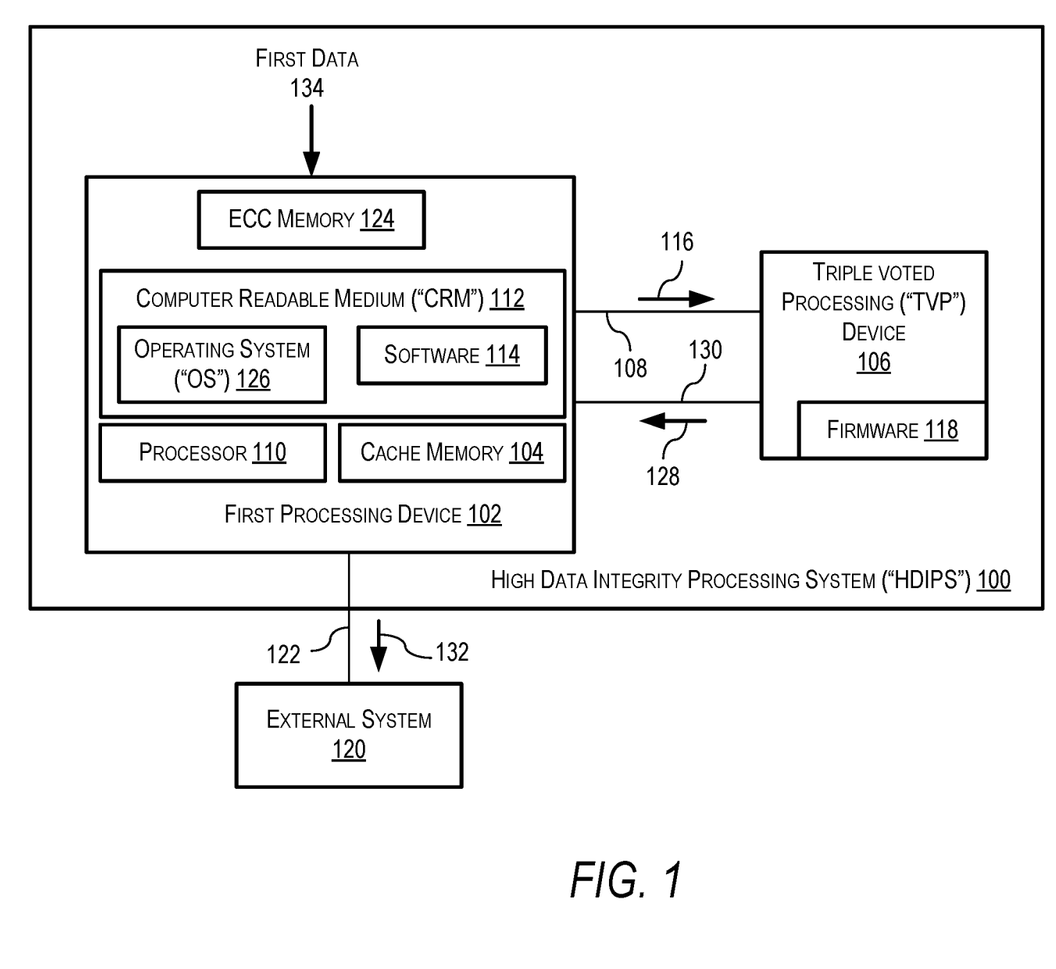
FIG. 1 is a system block diagram of an example of an implementation of a high data integrity processing system ("HDIPS") in accordance with the present disclosure.

More specifically, in FIG. 1, a system block diagram is shown of an example of an implementation of a HDIPS 100 in accordance with the present disclosure. The HDIPS 100 includes a first processing device 102 having a high radiation resistance, and a cache memory 104, and a TVP device 106 in signal communication with the first processing device 102 via signal path 108. The first processing device 102 includes a processor 110 and a CRM 112. The CRM 112 has encoded thereon computer-executable instructions (such as, for example, software 114) to cause the processor 110 to execute a periodic first integrity check on the first processing device 102 producing a first integrity result 116 that is transmitted to the TVP device 106. The TVP device 106 device includes firmware 118 having encoded thereon machine instructions to cause the TVP device 106 device to execute a second integrity check, simultaneously with the periodic first integrity check on the first processing device 102, producing a second integrity result, compare the first integrity result with the second integrity result, and power reset the first processing device 102 if the first integrity result 116 does not match the second integrity result. In this example, the HDIPS 100 may be in signal communication with an external system 120 via signal path 122.

In this example, the first processing device 102 has a high radiation resistance so as to minimize the effects of SEE, where SEE are caused by single, energetic particles, and can take on many forms as discussed earlier. As an example, the first processing device 102 may be a device utilizing silicon on insulator ("SOT") technology. The first processing device 102 may be a central processing device ("CPU").

The TVP device 106 also has a high radiation resistance to also minimize the effects of SEE. The TVP device 106 may also utilize SOT technology. Moreover, the TVP device 106 may be, for example, a field-programmable gate array ("FPGA") utilizing a triple-mode redundancy ("TMR") technology that is a fault-tolerant form of N-modular redundancy, in which three systems perform a process and the result is processed by a majority-voting system to produce a single output. In this approach, if any one of the three systems fails, the other two systems are able to correct and mask the fault.

In this example, the first processing device 102 may also include an error-correcting code ("ECC") memory 124 that may be located optionally within the first processing device 102 or external to the first processing device 102 (within the HDIPS 100) and in signal communication with the first processing device 102. It is appreciated by those of ordinary skill in the art that the ECC memory 124 is an error detecting and correction ("EDAC") memory that is immune to single-bit errors because the data that is read from each word (i.e., a fixed-size piece of data) is always the same as the data that had been written to it, even if one or more bits actually stored within the ECC memory 124 have been flipped to a wrong state. It is appreciated by of ordinary skill in the art that the ECC memory 124 may also utilize TMR technology or Hamming error correction.

The CRM 112 also includes an operating system ("OS") 126 that is a time, space, and partitioning operating system such as, for example, Avionics Application Standard Software Interface ("ARINC") 653. In this example, the ARINC 653 allows the hosting of multiple applications of different software levels on the same hardware. Each application software is called a partition and each application has its own memory space in the cache memory 104 and its own dedicated time slot allocated by a scheduler. It is appreciated by those of ordinary skill in the art that in computing, scheduling is a method of how work is assigned to resources that complete the work. The work may be virtual computation elements such as, for example, threads, processes or data flows, which are in turn scheduled onto hardware resources such as processors, network links or expansion cards. As such, the scheduler is what carries out the scheduling activity.

It is appreciated by those of ordinary skill in the art that the cache memory 104 is a type of memory that stores data so future requests for that data may be served faster, where the data stored in the cache memory 104 might be the result of an earlier computation, or the duplicate of data stored elsewhere. In this example, the cache memory 104 may be a random access memory ("RAM") that is integrated directly with the processor 110 or in direct signal communication with the processor 110 and can operate faster than the ECC memory 124. The cache memory 104 may include levels that describe the closeness and accessibility to the processor 110 such as, for example, level 1 ("L1") cache, level 2 ("L2") cache, and level 3 ("L3") cache.

In this example, the processor 110 is in signal communication with the CRM 112 via a signal path that may include a bus which in some instances may include one or more of a system bus, a data bus, an address bus, a peripheral component interconnect ("PCI") bus, a Mini-PCI bus, and any variety of local, peripheral, and/or independent buses. The computer-executable instructions stored on the CRM 112 may include, for example, the OS 126, a client module (not shown), a profile module (not shown), software 114, and other modules, programs, or applications that are loadable and executable by processor 110.

The CRM 112 may include computer storage media and/or communication media. The Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to RAM, static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, magnetic disk storage, magnetic cards or other magnetic storage devices or media, solid-state memory devices, or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

It is appreciated by those skilled in the art that the circuits, components, modules, and/or devices of, or associated with, the HDIPS 100 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

In an example of operation, the HDIPS 100 performs a method that includes executing a periodic first integrity check on the first processing device 102, having a high radiation resistance, producing the first integrity result 116 and executing the second integrity check, simultaneously with the periodic first integrity check, on the TVP device 106 producing a second integrity result. The method then includes comparing the first integrity result 116 with the second integrity result and power resetting the first processing device 102 with a power reset signal 128 if the first integrity result 116 does not match the second integrity result. In this example, the power reset signal 128 is transmitted from the TVP device 106 to the first processing device 102 via signal path 130. Once the first processing device 102 receives the power reset signal 128, the first processing device performs a cold restart which turns the first processing device 102 off and an on erasing all the data in the cache memory 104 and resetting the circuitry in the first processing device.

In general, the HDIPS 100 performs the periodic first integrity check by having the OS 126 produce a frame of memory within the cache memory 104 that is going to take a deterministic amount of time. The frame is divided into a plurality of partitions that have their own memory spaces (i.e., each partition has its own memory address) in the cache memory 104 and their own dedicated time slots allocated by the scheduler of the OS 126. The scheduler then allocates an initial partition of the frame (i.e., establishes an integrity partition of the frame of the cache memory 104) to performing a periodic first integrity check (i.e., in this application it is referred to as a "first" integrity check because the integrity check is being performed by, and at, the first processing device 102).

The processor 110 then executes a built-in-test ("BIT") for the first processing device 102 prior to receiving any data. The BIT is predetermined and rigorous enough to exercise enough of the first processing device 102 to produce a high confidence that the first processing device 102 is working deterministically. If any errors are detected, the errors are reported by HDIPS 100 with as much fidelity as possible. As an example of the BIT, the processor 110 may execute a subset of a plurality of operational codes for the first processing device 102 where the operational codes are codes that are utilized to control the operation of the processor 110. The first processing device 102 may then perform a data check process on the ECC memory 124.

The data check process may include: reading a memory value from the ECC memory 124; comparing the memory value against an ECC value of the ECC memory 124 corresponding to the memory value; regenerating a regenerated ECC value; and comparing the ECC value with the regenerated ECC value. The data check process may be performed optionally prior to the performing the first integrity check so as to confirm that the ECC memory 124 is not suffering from the effects of SEE prior to performing the BIT or after the first integrity. If the comparison of the ECC value with the regenerated ECC value does not match, the first processing device 102 may perform an ECC memory 124 mitigation process so as to prepare the ECC memory 124 for proper use. Once the data check of the ECC memory 124 is complete and the method may begin performing a computationally intensive process (i.e., a computationally complex computation) to properly tax the functions of the first processing device 102.

In this example, the data check is commonly known as "memory scrub." The purpose of scrubbing the ECC memory 124 is to insure the integrity of the data stored in the ECC memory 124 because the ECC memory 124 is where the HDIPS 100 stores all of its instructions and data when running and the ECC memory 124 is typically susceptible to the effects of SEE. As an example, the ECC memory 124 may be a synchronous DRAM ("SDRAM") such as, for example, a double data rate type three ("DDR3") SDRAM. In a SEE environment, it is known by those of ordinary skill in the art that individual cells in a DDR3 SDRAM will spontaneously and randomly change state (i.e., from a Logic 0 to a Logic 1 or vice versa).

Generally, the rate at which the cells of DDR3 SDRAM flip bits due to SEE is determined by altitude. In operation, when data is written into the DDR3 storage of the ECC memory 124, an ECC is also automatically written into the same location. In this disclosure, scrubbing (i.e., the data check process) includes reading a set of memory locations within the ECC memory 124, re-calculating the ECC syndrome, and comparing that result against the original ECC syndrome read from the memory location. In this example, the ECC syndrome mechanism included on the first processing device 102 is capable of performing an extended Hamming code with additional parity that known as single error correction, double error detection ("SECDED"). In general, if the first processing device 102 finds one error, the first processing device 102 writes back a corrected version of the data to the ECC memory 124. If a double bit-flip occurs, the HDIPS 100 may not be able to recover the data and a reset will be needed. Since the ECC memory 124 is susceptible to SEE effects the longer the time between scrubbing, the greater the chance of distorting the data in the ECC memory 124 because of SEE effects. As such, the HDIPS 100 will run the data check process at a rate that will reduce the probability of incurring a double bit-flip. This rate is predetermined by the system designer.

Once the BIT is complete and no errors are detected, the first processing device 102 and TVP device 106 may utilize a computationally intensive process for both the first and second integrity checks, where the process is computationally intensive enough to utilize a significant portion of the resources of the first processing device 102 so as to comprehensively test the state of the circuits in the first processing device 102 to see if they are suffering from the effects of SEE. In this example, the computationally intensive process may include generating a first pseudo-random sequence utilizing a first linear-feedback shift register ("LFSR") with the first processing device 102 and, simultaneously, generating a second pseudo-random sequence utilizing a second LFSR with the TVP device 106. Comparing the first integrity check with the second integrity check then includes comparing the first pseudo-random sequence of the first integrity result 116 with the second pseudo-random sequence at the TVP device 106. In this example, the first LFSR and second LFSR in a seed that is the same in both first processing device 102 and the TVP device 106, where the seed is the initial value of both the first and second LFSR. In this example, it is appreciated by those of ordinary skill that an LFSR is a shift register that has an input bit that is a linear function of its previous state and because the operation of the shift register is deterministic, the stream of values produced by the register is completely determined by its current (or previous) state. Moreover, since the shift register has a finite number of possible states, it will eventually enter into a repeating cycle; however, an LFSR with a well-chosen feedback function will produce a sequence of bits that appears random and have a very long cycle so as to produce a pseudo-random number.

Once the first processing device 102 completes the first integrity check, the first processing device 102 is ready to perform a double authentication sub-process. The double authentication process include performing a predetermined amount of M calculations before the next first integrity check is performed, where the number M is predetermined by the design of the HDIPS 100 or a system level user that may program the HDIPS 100. These M calculations may be important, hazardous, or critical calculations that that need to have high integrity in their values so that other systems (e.g., external system 120) may properly rely on their values in a SEE environment. For example, an aircraft utilizing an autopilot, navigation, or system alert system needs to make sure that the electrical and electronic systems and sub-systems are producing accurate and reliable values so as to not cause an issue in a SEE environment. As a result, the HDIPS 100 performs a method that assures that any output data 132 from the HDIPS 100 is reliable and that the HDIPS 100 is assured to not produce any bad data as the output data 132. The sub-process is referred to as a "double authentication" process because the calculations are preformed twice in the first processing device 102.

As such, the HDIPS 100 executes the M amount of calculations between the periodic first integrity checks performed by the first processing device 102 utilizing computer-executable instructions that include: receiving first data 134 at the first processing device 102; executing, at a first time value, a first calculation of the first data 134 to produce a first result; flushing the cache memory 104 after executing the first calculation; executing, at a second time value, a second calculation of the first data 134 to produce a second result; comparing, at a third time value, the first result with the second result; and flushing the cache memory 104 if the first result does not match the second result.

In this example, the second time value is subsequent to the first time value and the third time value is subsequent to the second time value. Moreover, executing the first calculation includes executing the first calculation in a first partition of a frame of the cache memory 104 and storing the first result in the ECC memory 124 prior to flushing the cache memory 104. The first partition has a first memory address in the cache memory 104. Furthermore, executing the second calculation includes executing the second calculation in a second partition of the frame of the cache memory 104 after the flushing the cache memory 104, where the second partition has a second memory address in the cache memory 104. The first and second memory addresses are different so as to assure that there is no residual values from the first partition effecting the second partition.

More specifically, the purpose of flushing the cache memory 104 after executing the first calculation is to start from a known configuration before performing the second calculation so as to produce the second result deterministically. Since in this example the OS 126 is a time and spaced partitioned system, the OS 126 dictates that the first task is performed for a deterministic amount of time and then another task is also performed for a deterministic amount of time. As such, the flushing of the cache memory 104 between these two calculations ensures that the data produced by the second partition (i.e., the second result) is not in any way influenced by any "stale" data left over from the first partition. In this way, the "space" portion of the time and space partitioning enforces the model that each task element executes out of its own proprietary memory space and that the contents of these spaces are not modified between active partitions. It is appreciated that in this example, that the flushing process is limited to the cache memory 104 and the ECC memory 124 is not flushed.

If the first result does match the second result, the computer-executable instructions 114 cause the first processing device 102 to transmit the first result to the external system 120, via signal path 122, if the first result does match the second result and, if the first result does not match the second result, the first processing device 102 repeats the steps of receiving the first data 134, recalculating the first and second calculations, and comparing the new first and second results.

In this example, each partition will place the result of its calculation into a common memory area in the ECC memory 124 with an assigned memory address and range for each partition. In all cases, an active partition stores its calculated results to the common memory area before flushing the cache memory 104 and transitioning to the next partition. When the first processing device 102 is ready to output data to the outside world (i.e., to the external system 120) a special partition type is scheduled and run by the OS 126. The partition is an input-output ("I/O") partition.

If the first result does match the second result, prior to transmitting the first result to the external system 120, the computer-executable instructions 114 cause the processor 110 to further compare the first result to a historical average value. If the first result does not match the historical average value, the computer-executable instructions 114 cause the processor 110 flush the cache memory 104 and repeat the step of receiving the first data 134, recalculating the first and second calculations, comparing the new first and second results, and comparing the new first result with the historical average value.

If first result first result does match the historical average value, the computer-executable instructions 114 cause the processor 110 to further compare the first result against an error limit to determine if the first result is within an error limit. The error limit is a window of values that have a maximum and a minimum that correspond to the possible values for the given calculation being performed by the processor 110.

As an example, the HDIPS 100 may be performing calculations on a rate of turn of an aircraft at given velocity. The historical average value is an average over a predetermined amount of time of what the rate of turn has been for that predetermined amount of time. If the calculated rate of turn produced by the first processing device 102 is outside of a match window (i.e., a predetermined range of values that are approximately equal to the historical average value), the calculated rate of turn is considered by HDIPS 100 to be outside the range of acceptable values for the rate of turn the aircraft and the HDIPS 100 rejects the calculated rate of turn and forces the HDIPS 100 to recalculate a new rate of turn to test against the historical average value.

Similarly, a given data parameter may have an upper and lower limit that is acceptable for predetermined purposes and if calculated values fall outside of those upper or lower limits (i.e., the window of the error limit or simply the "limit window"), the calculated value is rejected by the HDIPS 100 irrespective that the calculated value matches after multiple calculations and matches the historical average value. As another example utilizing rate of turn of an aircraft, if it is predetermined that for a given aircraft it is dangerous to have a rate of turn that is more than 15 degrees, the HDIPS 100 will reject calculations that attempt to send an output data 132 to the external system 120 that will request more than a 15 degree rate of turn even if the calculation is confirmed through the first processing device 102 and matches against the historical average value (e.g., in the past the aircraft was forced to perform maneuvers that caused rates of turn greater than 15 degrees even though they were hazardous to the aircraft). As such, the HDIPS 100 will transmit the output data 132 to the external system 120 only if the first processing device 102 receives the first data 134, preforms a double calculation that matches the results of both calculations, matches a historical average value, and matches an error limit.

In all of these examples, the HDIPS 100 utilizes the first processing device 102 to determine if a reset of the first processing device 102 will occur in response to an error in the BIT, an error in the data check, or mismatch in the first and second results in the double authentication process with the exception of a mismatch within the integrity check. As described earlier, the HDIPS 100 will utilize the TVP device 106 to cause the first processing device 102 to reset if the HDIPS 100 fails the integrity check.

Figure 2:
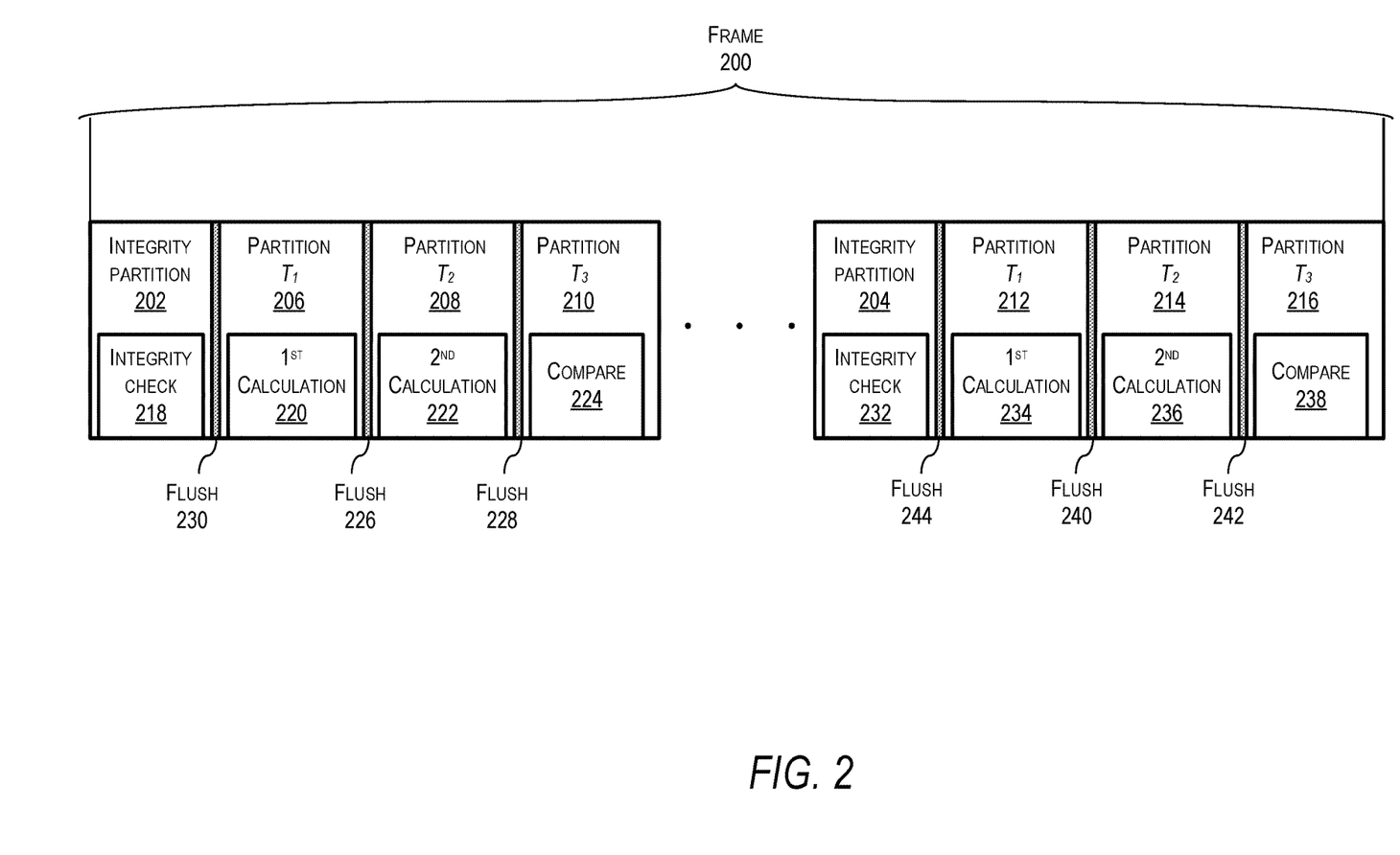
FIG. 2 is a system block diagram of an example of an implementation of a frame for use with the HDIPS shown in FIG. 1 in accordance with the present disclosure.

Turning to FIG. 2, a system block diagram is shown of an example of an implementation of a frame 200 for use with the HDIPS 100 in accordance with the present disclosure. In this example, the frame 200 is shown to include periodic repetition of partitions that are deterministically performed by the HDIPS 100. The frame 200 is shown to have a first integrity partition 202 at the beginning of the frame 200 and a second integrity partition 204 close to the end of the frame 200. It is appreciated by those of ordinary skill in the art that for purposes of illustration only two integrity partitions are shown but that they may any number of integrity partitions within the frame 200 based on the design parameters and timing limit of the frame 200. The frame 200 may also include a plurality of partitions between the first initial integrity partition 202 and the second initial integrity partition 204. For example, the frame 200 may include, after the first integrity partition 202, a first partition 206 at a first time ("$T_1$"), a second partition 208 at a second time ("$T_2$"), and a third partition 210 at a third time ("$T_3$"). Similarly, the frame 200 may also include, after the second integrity partition 204, a first partition 212 at a $T_1$, a second partition 214 at a $T_2$, and a third partition 216 at a $T_3$.

As discussed earlier, the first integrity check 218 is performed as a task in the first initial integrity partition 202 at an initial time ("$T_0$"). The first calculation task 220 is executed as a task in the first partition 206 at $T_1$ after the first initial integrity partition 202. The second calculation task 222 is executed as a task in the second partition 208 at $T_2$ after the first calculation 220 at $T_1$. The comparison task 224 of the first result from the first calculation 220 and the second result from the second calculation 222 is performed in the third partition 210 at $T_3$ after the second calculation 222 at $T_2$. As discussed earlier, between the first calculation 220 and the second calculation 222, the HDIPS 100 flushes 226 the first partition 206 after the first calculation 220 is complete. The HDIPS 100 may also flush 228 the second partition 208 after the second calculation 222 is complete. The values of the first and second calculations 220 and 222 (i.e., the first and second results) may be stored in the ECC memory 124 prior to the cache memory 104 flush 226 of the first partition 206 and the flush 228 of the second partition 208. The HDIPS 100 may also flush 230 the cache memory 104 after performing the first integrity check 218.

Similarly, since the integrity checks are periodic they repeat after a predetermined time in a deterministic fashion, the first integrity check 232 is performed as a task in the first initial integrity partition 202 at $T_0$. The first calculation task 234 is executed as a task in the first partition 212 at $T_1$ after the first initial integrity partition 204. The second calculation task 236 is executed as a task in the second partition 214 at $T_2$ after the first calculation 234 at $T_1$. The comparison task 238 of the first result from the first calculation 234 and the second result from the second calculation 236 is performed in the third partition 216 at $T_3$ after the second calculation 236 at $T_2$. As discussed earlier, between the first calculation 234 and the second calculation 236, the HDIPS 100 flushes 240 the first partition 212 after the first calculation 234 is complete. The HDIPS 100 may also flush 242 the second partition 214 after the second calculation 236 is complete. The values of the first and second calculations 234 and 236 (i.e., the first and second results) may be stored in the ECC memory 124 prior to the cache memory 104 flush 240 of the first partition 212 and the flush 242 of the second partition 214. The HDIPS 100 may also flush 244 the cache memory 104 after performing the first integrity check 232. In these examples, the cache memory 104 is being flushed but not the ECC memory 124.

Figure 3:
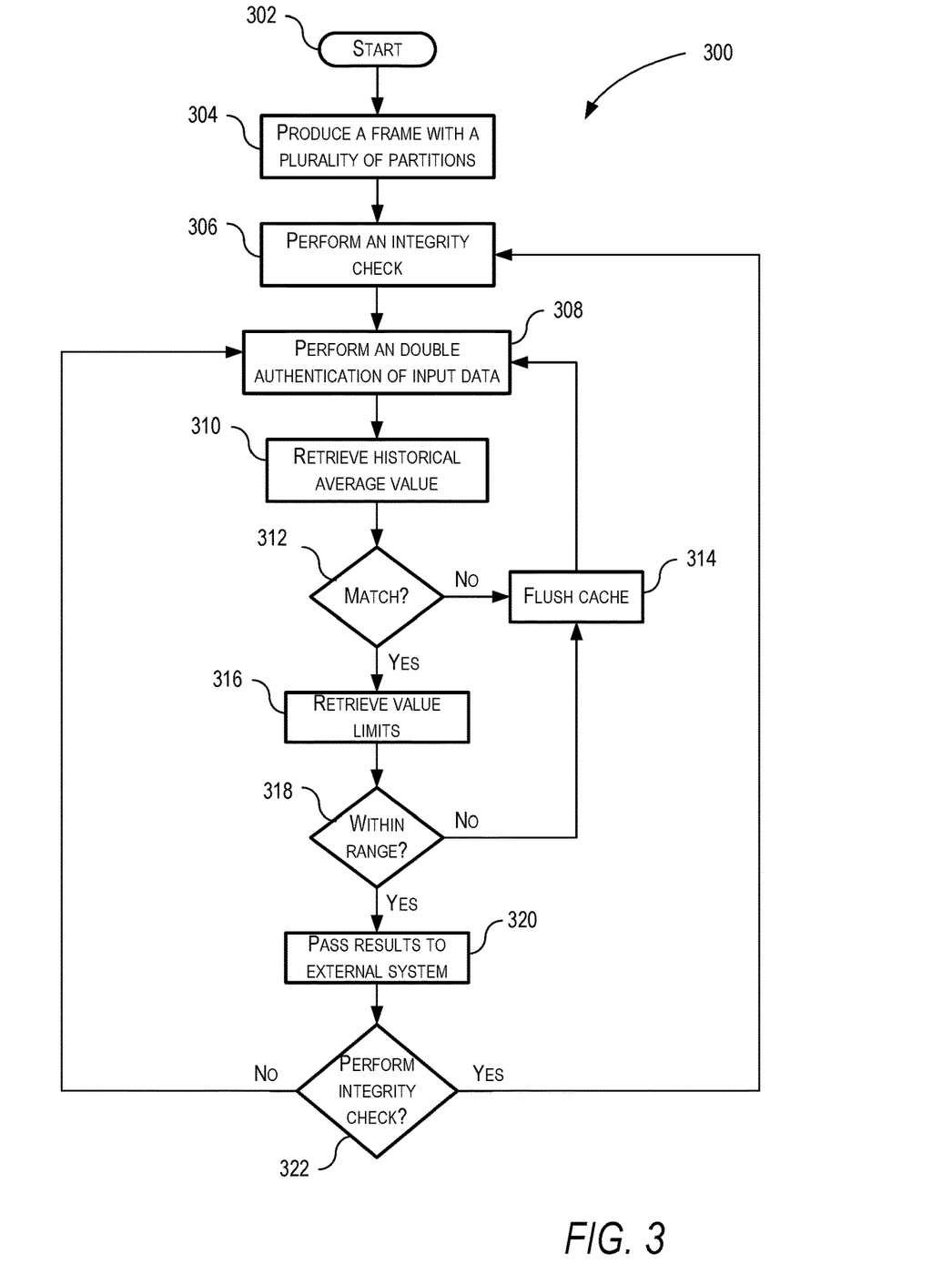
FIG. 3 is a flowchart of an example of an implementation of a method performed by the HDIPS shown in FIG. 1 in accordance with the present disclosure.

Turing to FIG. 3, a flowchart of an example of an implementation of a method 300 performed by the HDIPS 100 is shown in accordance with the present disclosure. In this example, the method 300 starts 302 by the HDIPS 100 producing 304 a frame 200 with a plurality of partitions as described earlier. The plurality of partitions include: a first initial integrity partition 202 at $T_0$; a first partition 206 at $T_1$ at a first memory address; a second partition 208 at $T_1$ at a second memory address; and a third partition 210 at $T_3$ at a third memory address. The HDIPS 100 then performs an integrity check 306 as described earlier. The HDIPS 100 receives the first data 134 and performs a double authentication 308 of the first data 134 as described earlier. The HDIPS 100 then retrieves a historical average value 310 and compares 312 it to the result (i.e., the first result that matched the second result) of the double authentication 308 to determine if there is a match. If there is no match, the HDIPS 100 then flushes 314 the cache memory 104 and the process returns to step 308 and repeats.

If, instead, there is a match, the process then continues to step 316. In step 316, the HDIPS 100 retrieves an upper limit value, lower limit value, or both for the corresponding calculation on the first data 134 that was double authenticated. The HDIPS 100 then determines 318 if the calculated first result is within the range of the lower limit to the upper limit values (i.e., the limit window). If the first result is not within the limit window, the HDIPS 100 flushes 314 cache memory 104 and the process returns to step 308 and repeats.

If, instead, the first result is within the limit window, the HDIPS 100 passes (i.e., transmits) 320 the first result to the external system 120. The HDIPS 100 then determines 322 if a periodic integrity check is to be performed. If no, the process returns to step 308 and the process repeats. If, instead, a periodic integrity check is to be performed, the process returns to step 306 and the process repeats.

Figure 4:
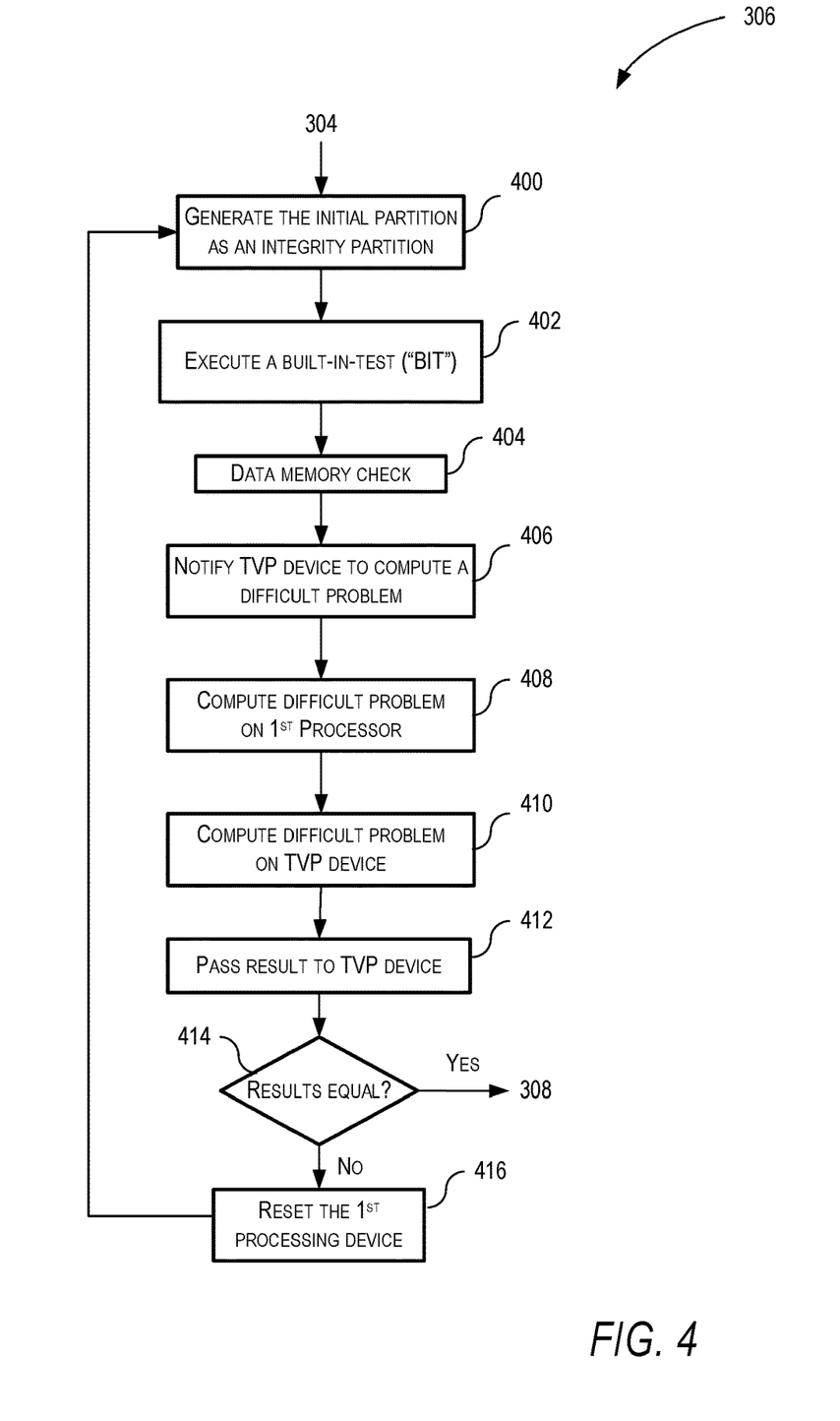
FIG. 4 is a flowchart of an example of an implementation of a method to perform the integrity check process shown in FIG. 3 in accordance with the present disclosure.

In FIG. 4, a flowchart of an example of an implementation of a method to perform the integrity check 306 (of FIG. 3) is shown in accordance with the present disclosure. In this example, the HDIPS 100 generates (i.e., produces) 400 an initial partition of the frame 200 as an integrity partition 202 and then executes 402 the BIT. The HDIPS 100 then performs a data memory check 404 on the cache memory 104 and notifies 406 the TVP device 106 to compute a computationally intensive calculation. The first processing device 102 then executes 408 the computationally intensive calculation and the TVP device 106, simultaneously, executes 410 the computationally intensive calculation. As described earlier, the computationally intensive calculation may include generating a first pseudo-random sequence utilizing a LFSR. The result of the first processing device 102 is passed 412 to the TVP device 106 and the TVP device 106 determines 414 if the results from the first processing device 102 and TVP device 106 are equal. If the results are not equal, the TVP device 106 produces the power reset signal 128 and passes it to the first processing device 102. Once the first processing device 102 receives the power reset signal 128, the first processing device 102 is reset 416 and the process returns to step 400 and the process repeats.

Figure 5:
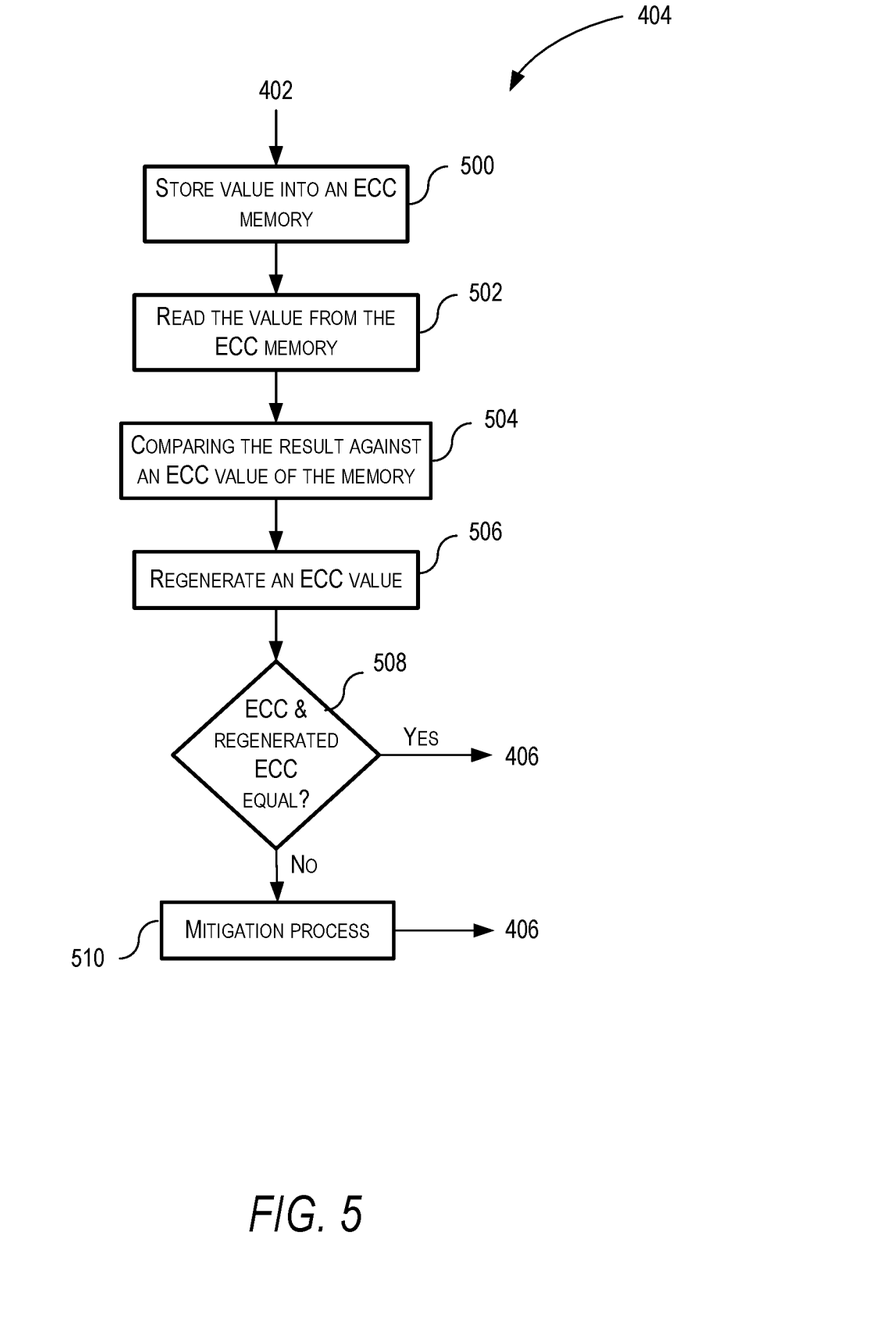
FIG. 5 is a flowchart of an example of an implementation of a method to perform the data memory check process shown in FIG. 4 in accordance with the present disclosure.

In FIG. 5, a flowchart of an example of an implementation of a method to perform the data memory check 404 (of FIG. 4) is shown in accordance with the present disclosure. In this example, as described earlier, the data check process 404 may include: storing 500 a value into the ECC memory 124; reading 502 the stored memory value from the ECC memory 124; comparing 504 the memory value against an ECC value of the ECC memory 124 corresponding to the memory value; regenerating 506 a regenerated ECC value; and comparing 508 the ECC value with the regenerated ECC value. If the ECC value does not equal (i.e., match) the regenerated ECC value an error has occurred and the HDIPS 100 performs a mitigation process 510 as described earlier and the process continues to step 406. If, instead, the ECC values does match the regenerated ECC value, the process continues to step 406.

Figure 6:
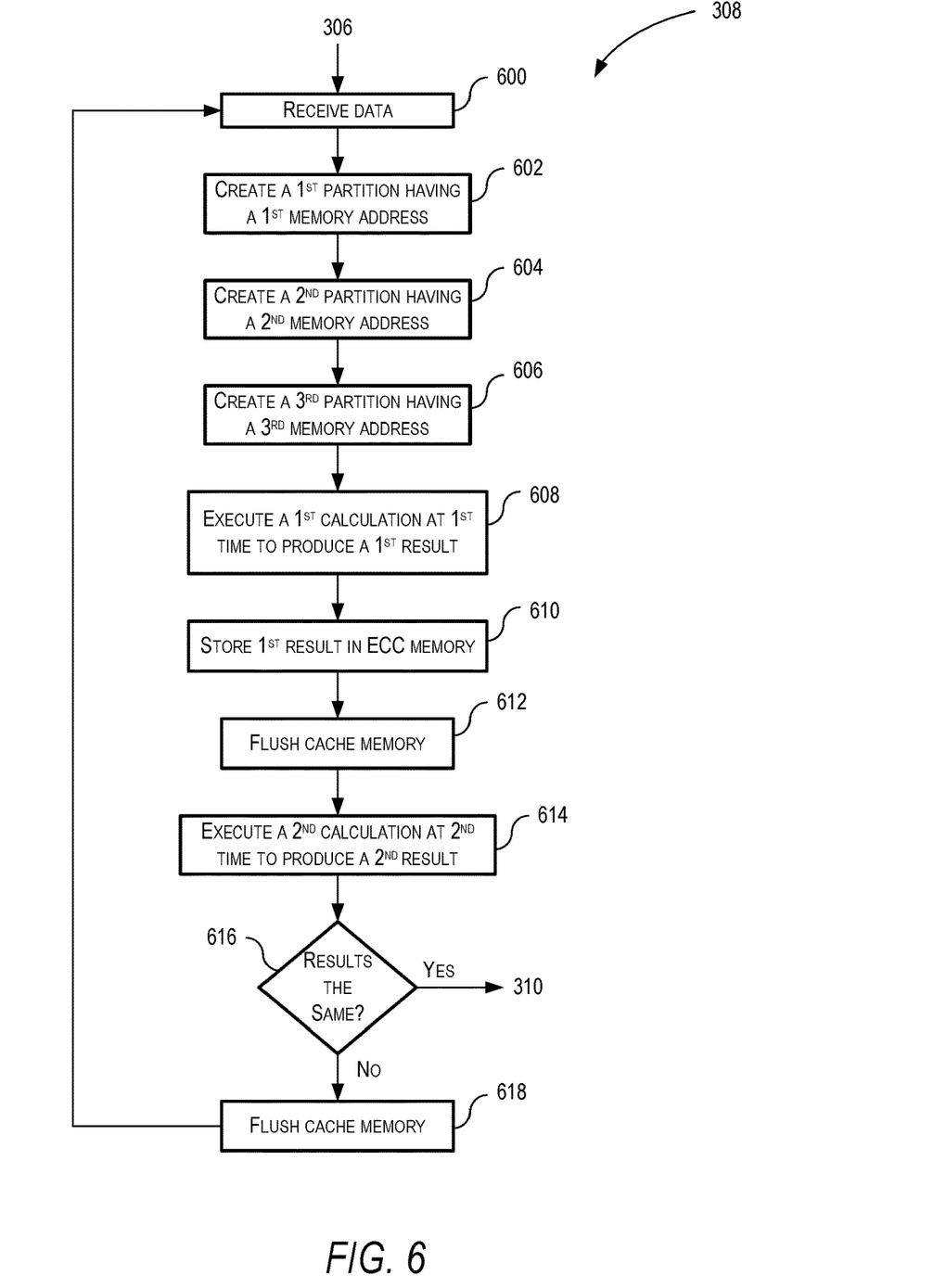
FIG. 6 is a flowchart of an example of an implementation of a method to perform the double authentication process shown in FIG. 3 in accordance with the present disclosure.

In FIG. 6, a flowchart of an example of an implementation of a method to perform the double authentication process 308 (of FIG. 3) is shown in accordance with the present disclosure. As described earlier, in the double authentication process 308, the HDIPS 100 receives 600 the first data 134. The scheduler of the first processing device 102 then creates 602, 604, and 606 a first partition 206 having a first memory address at a first time (i.e., $T_1$), a second partition 208 having a second memory address at a second time (i.e., $T_2$), and a third partition 210 having a third memory address at a third time (i.e., $T_3$). The method then executes 608 at a first time value, a first calculation 220 of the first data 134 to produce a first result, stores 610 the first result in the ECC memory 124, and flushes 612 the cache memory 104 after executing the first calculation 220. The method then executes 614, at a second time value, a second calculation 222 of the first data 134 to produce a second result and compares 616, at a third time value, the first result with the second result. If the first result does not match the second result, the method flushes 618 the cache memory 104 and the process proceeds to step 600 where a new data is received by the HDIPS 100 as new first data 134 and the process repeats. If, instead, the first result does match the second result, the process proceeds to step 310.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

The flowchart and block diagrams in the different depicted example of implementations illustrate the architecture, functionality, and operation of some possible implementations of apparatuses and methods in an illustrative example. In this regard, each block in the flowchart or block diagrams may represent a module, a segment, a function, a portion of an operation or step, some combination thereof.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different examples of implementations has been presented for purposes of illustration and description, and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

The flowchart and block diagrams in the different depicted example of implementations illustrate the architecture, functionality, and operation of some possible implementations of apparatuses and methods in an illustrative example. In this regard, each block in the flowchart or block diagrams may represent a module, a segment, a function, a portion of an operation or step, some combination thereof.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different examples of implementations has been presented for purposes of illustration and description, and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

What is claimed is:

1. A high data integrity processing system ("HDIPS"), the HDIPS comprising:
a first processing device, wherein the first processing device includes a processor and a computer-readable medium ("CRM"), the CRM having, encoded thereon, first computer-executable instructions to cause the processor to perform a periodic first integrity check on the first processing device to produce a first integrity result;
a cache memory; and
a triple-voted processing ("TVP") device in signal communication with the first processing device, wherein the TVP device includes firmware, the firmware having, encoded thereon, machine instructions to cause the TVP device to:
perform a second integrity check, substantially simultaneously with the periodic first integrity check on the first processing device to produce, a second integrity result,
compare the first integrity result with the second integrity result, and
power reset the first processing device if the first integrity result does not match the second integrity result.

2. The HDIPS of claim 1, wherein the first processing device utilizes silicon on insulator ("SOT") technology, and wherein the TVP device is a field-programmable gate array ("FPGA") utilizing a triple-mode redundancy ("TMR") technology.

3. The HDIPS of claim 2, wherein the first processing device utilizes an Avionics Application Standard Software Interface ("ARINC") 653 operating system ("OS").

4. The HDIPS of claim 1, wherein the CRM further includes, encoded thereon, second computer-executable instructions to perform, after performance of the first periodic integrity check, a double authentication process ("DAP") of first data, wherein the second computer-executable instructions cause the processor to:
receive the first data at the first processing device,
execute, at a first time value, a first calculation of the first data to produce a first DAP result,
flush the cache memory after executing the first calculation,
execute, at a second time value, a second calculation of the first data to produce a second DAP result, wherein the second time value is subsequent to the first time value,
compare, at a third time value, the first DAP result with the second DAP result, wherein the third time value is subsequent to the second time value, and
flush the cache memory if the first DAP result does not match the second DAP result.

5. The HDIPS of claim 4, wherein the cache memory is a random access memory ("RAM") that is integrated directly with the processor or is in direct signal communication with the processor.

6. The HDIPS of claim 4, wherein the second computer-executable instructions that execute the first calculation and that execute the second calculation, include particular computer-executable instructions that cause the processor to:
execute the first calculation in a first partition of a frame of the cache memory having a first memory address,
store the first DAP result in an error-correcting code ("ECC") memory in signal communication with the first processing device prior to flushing the cache memory, and execute the second calculation in a second partition of the frame of the cache memory having a second memory address after the flushing the cache memory.

7. The HDIPS of claim 6, wherein the first computer-executable instructions that perform the periodic first integrity check on the first processing device include particular computer-executable instructions that cause the processor to:
    establish an integrity partition of the frame that is located at a beginning of the frame prior to the first partition,
    execute a built-in-test ("BIT") for the first processing device prior to receiving the first data, and
    perform a data check of the ECC memory.

8. The HDIPS of claim 7, wherein a portion of the particular computer-executable instructions that perform the data check cause the processor to:
    read a memory value from the ECC memory,
    compare the memory value against an ECC value of the ECC memory corresponding to the memory value,
    generate a regenerated ECC value, and
    compare the ECC value with the regenerated ECC value.

9. The HDIPS of claim 1, wherein the first computer-executable instructions that perform the periodic first integrity check on the first processing device cause the processor to generate a first pseudo-random sequence utilizing a first linear-feedback shift register ("LFSR") within the first processing device, wherein the machine instructions that perform the second integrity check on the TVP device cause the TVP device to generate a second pseudo-random sequence utilizing a second LFSR within the TVP device, and wherein the machine instructions that cause the TVP device to compare the first integrity result with the second integrity result cause the TVP device to compare the first pseudo-random sequence with the second pseudo-random sequence.

10. The HDIPS of claim 9, wherein the first LFSR and the second LFSR include a seed that is the same for both.

11. The HDIPS of claim 4, wherein the CRM further includes, encoded thereon, third computer-executable instructions, wherein the third computer-executable instructions cause the processor to:
    transmit the first DAP result to an external system in signal communication with the first processing device if the first DAP result does match the second DAP result, and
    receiving second data at the first processing device after flushing the cache memory if the first DAP result does not match the second DAP result.

12. The HDIPS of claim 11, wherein the first processing device is a device utilizing silicon on insulator ("SOI") technology, and wherein the TVP device is a field-programmable gate array ("FPGA") utilizing a triple-mode redundancy ("TMR") technology.

13. The HDIPS of claim 12, wherein the first processing device utilizes an Avionics Application Standard Software Interface ("ARINC") 653 operating system ("OS").

14. A method for high data integrity processing within a radiation environment with a high data integrity processing system ("HDIPS") in signal communication with an external system, the method comprising:
    performing a periodic first integrity check on a first processing device to produce a first integrity result;
    performing a second integrity check, substantially simultaneously with the periodic first integrity check, on a triple-voted processing ("TVP") device to produce a second integrity result;
    comparing the first integrity result with the second integrity result; and
    power resetting the first processing device in response to the first integrity result not matching the second integrity result.

15. The method of claim 14, further comprising, after performance of the periodic first integrity check, performing a double authentication process ("DAP") for first data, the DAP including:
    receiving the first data at the first processing device,
    executing, at a first time value, a first calculation of the first data to produce a first DAP result,
    flushing a cache memory after executing the first calculation,
    executing, at a second time value, a second calculation of the first data to produce a second DAP result, wherein the second time value is subsequent to the first time value,
    comparing, at a third time value, the first DAP result with the second DAP result, wherein the third time value is subsequent to the second time value,
    flushing the cache memory if the first DAP result does not match the second DAP result, and
    transmitting the first DAP result to an external system in signal communication with the first processing device if the first DAP result does match the second DAP result.

16. The method of claim 15, wherein executing the first calculation includes:
    executing the first calculation in a first partition of a frame of a cache memory having a first memory address, and
    storing the first DAP result in an error-correcting code ("ECC") memory in signal communication with the first processing device prior to flushing the cache memory, and
    wherein executing the second calculation includes executing the second calculation in a second partition of the frame of the cache memory having a second memory address after the flushing the cache memory.

17. The method of claim 16, wherein executing the periodic first integrity check on the first processing device includes:
    establishing an integrity partition of the frame of the cache memory that is located at a beginning of the frame prior to the first partition,
    executing a built-in-test ("BIT") for the first processing device prior to receiving the first data, and
    data checking the ECC memory.

18. The method of claim 17, wherein data checking the ECC memory includes:
    reading a memory value from the ECC memory,
    comparing the memory value against an ECC value of the ECC memory corresponding to the memory value,
    regenerating a regenerated ECC value, and
    comparing the ECC value with the regenerated ECC value.

19. The method of claim 14, wherein performing the periodic first integrity check on the first processing device includes generating a first pseudo-random sequence utilizing a first linear-feedback shift register ("LFSR") within the first processing device, wherein performing the second integrity check on the TVP device includes generating a second pseudo-random sequence utilizing a second LFSR within the TVP device, wherein comparing the first integrity result with the second integrity result includes comparing the first pseudo-random sequence with the second pseudo-random sequence, and wherein the first LFSR and the second LFSR each include an identical seed.

20. The method of claim 15, further includes:

comparing the first DAP result to a historical average value if the first DAP result does match the second DAP result prior to transmitting the first DAP result to the external system, flushing the cache memory if the first DAP result does not match the historical average value, determining if the first DAP result is within an error limit if the first DAP result does match the historical average value, wherein the first DAP result is transmitted to the external system if the first DAP result matches the historical average value and is within the error limit; and flushing the cache memory if the first DAP result is not within the error limit.

* * * * *